(12) United States Patent
Suehiro et al.

(10) Patent No.: US 12,425,754 B2
(45) Date of Patent: Sep. 23, 2025

(54) OPTICAL LINE TERMINAL, OPTICAL COMMUNICATION SYSTEM, BANDWIDTH ALLOCATION METHOD, CONTROL CIRCUIT, AND STORAGE MEDIUM

(71) Applicant: Mitsubishi Electric Corporation, Tokyo (JP)

(72) Inventors: Takeshi Suehiro, Tokyo (JP); Kenichi Nakura, Tokyo (JP); Akiko Iwasaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 248 days.

(21) Appl. No.: 18/235,915

(22) Filed: Aug. 21, 2023

(65) Prior Publication Data

US 2023/0421935 A1 Dec. 28, 2023

Related U.S. Application Data

(63) Continuation of application No. PCT/JP2021/013374, filed on Mar. 29, 2021.

(51) Int. Cl.
*H04B 10/00* (2013.01)
*H04Q 11/00* (2006.01)
*H04J 14/00* (2006.01)

(52) U.S. Cl.
CPC . *H04Q 11/0067* (2013.01); *H04Q 2011/0064* (2013.01); *H04Q 2011/0086* (2013.01)

(58) Field of Classification Search
CPC ........ H04B 10/272; H04J 14/08; H04J 14/086
See application file for complete search history.

(56) References Cited

U.S. PATENT DOCUMENTS

| 2022/0131610 A1* | 4/2022 | Nakura | H04B 10/27 |
| 2022/0256262 A1 | 8/2022 | Suehiro et al. | |
| 2022/0264203 A1* | 8/2022 | Ma | H04J 14/0282 |

FOREIGN PATENT DOCUMENTS

| JP | 6590017 B2 | 10/2019 |
| JP | 6804695 B1 | 12/2020 |

OTHER PUBLICATIONS

Japanese Notification of Reason for Refusal dated Jun. 20, 2023 in Japanese Patent Application No. 2023-509934.
(Continued)

*Primary Examiner* — Daniel G Dobson
(74) *Attorney, Agent, or Firm* — Birch, Stewart, Kolasch & Birch, LLP (57) ABSTRACT

An optical line terminal includes: one or more optical line termination units to which an optical network unit of an optical communication system is connected, the one or more optical line termination units acquiring an allocation requested bandwidth from the optical network unit connected; a slice management unit that manages slice configuration information indicating which slice each of the optical network unit connected to the optical line termination unit is included in, and manages a limitation on allocation of bandwidth for the optical network unit as a parameter for allocating bandwidth; and a bandwidth allocation unit that determines, for each of the slice, an allocated bandwidth for each of the optical network unit connected to the optical line termination unit on the basis of the allocation requested bandwidth, the slice configuration information, and the parameter for allocating bandwidth.

10 Claims, 7 Drawing Sheets

(56) References Cited

OTHER PUBLICATIONS

Sarashina et al., "Demonstration of Virtualized Optical Access Network for 5G/IoT—Management and Allocation of PON -resources-", IEICE Technical Report, Sep. 2020, total 7 pages.

\* cited by examiner

| | OPTICAL LINE TERMINATION UNIT #1 | OPTICAL LINE TERMINATION UNIT #2 | LIMITATION |
|---|---|---|---|
| SLICE #1 | ONU#1<br>ONU#2 | - | (#1, #2): 4Gbps |
| SLICE #2 | ONU#1<br>ONU#3 | ONU#4<br>ONU#6 | (#1, #3, #4): 6Gbps<br>(#6): 2Gbps |
| SLICE #3 | ONU#2<br>ONU#3 | ONU#5<br>ONU#6 | (#2, #3): 5Gbps<br>(#5, #6): 3Gbps |

SLICE CONFIGURATION INFORMATION — BANDWIDTH ALLOCATION PARAMETER

FIG.6

|          | ONU#1  | ONU#2  | ONU#3  | ONU#4  | ONU#5  | ONU#6  |
|----------|--------|--------|--------|--------|--------|--------|
| SLICE #1 | 2 Gbps | 6 Gbps | -      | -      | -      | -      |
| SLICE #2 | 1 Gbps | -      | 3 Gbps | 1 Gbps | -      | 3 Gbps |
| SLICE #3 | -      | 1 Gbps | 3 Gbps | -      | 1 Gbps | 1 Gbps |

FIG.7

|          | ONU#1  | ONU#2  | ONU#3  | ONU#4  | ONU#5  | ONU#6  |
|----------|--------|--------|--------|--------|--------|--------|
| SLICE #1 | 1 Gbps | 3 Gbps | -      | -      | -      | -      |
| SLICE #2 | 1 Gbps | -      | 3 Gbps | 1 Gbps | -      | 2 Gbps |
| SLICE #3 | -      | 1 Gbps | 3 Gbps | -      | 1 Gbps | 1 Gbps |

OPTICAL LINE TERMINAL, OPTICAL COMMUNICATION SYSTEM, BANDWIDTH ALLOCATION METHOD, CONTROL CIRCUIT, AND STORAGE MEDIUM

CROSS-REFERENCE TO RELATED APPLICATION

This application is a continuation application of International Application PCT/JP2021/013374, filed on Mar. 29, 2021, and designating the U.S., the entire contents of which are incorporated herein by reference.

BACKGROUND OF THE INVENTION

1. Field of the Invention

The present disclosure relates to an optical line terminal in a passive optical network (PON) system, an optical communication system, a bandwidth allocation method, a control circuit, and a storage medium.

2. Description of the Related Art

A PON system also referred to as a passive optical network system is known as a system applied to an access section of a communication network. In the PON system, one optical line terminal (OLT) installed on a higher side of a network and a plurality of optical network units (ONU) installed on a lower side of the network are connected via an optical splitter. A communication channel between the OLT and the optical splitter is shared by the plurality of ONUs and thus multiplexed. For example, a PON system using time division multiplexing (TDM) is called a TDM-PON system. Communication directed from the ONUs to the OLT in the TDM-PON system applies dynamic bandwidth allocation (DBA) in which each ONU transmits an allocation requested bandwidth, which is information held in the ONU and related to an amount of data waiting for transmission, to the OLT, and the OLT dynamically allocates an available bandwidth to each ONU according to the allocation requested bandwidth that is received from each ONU. The DBA may set parameters for allocating bandwidth such as a fixed bandwidth, a guaranteed bandwidth, and a maximum bandwidth. The fixed bandwidth means a bandwidth that is fixedly allocated regardless of a traffic status of the ONU, the guaranteed bandwidth means a bandwidth that is guaranteed to be allocated if necessary depending on a traffic status of the ONU, and the maximum bandwidth means a maximum bandwidth that is allocated to the ONU. Note that the OLT may include a plurality of optical line termination units each of which has a function equivalent to that of one OLT, and a line concentrator that puts together the optical line termination units. The OLT is also referred to as an optical line terminal.

Now, as various kinds of communication services have become available nowadays, a technology of accommodating and providing various communication services in one communication network has been studied, the various communication services being a plurality of services having different requirements for communication such as a mobile broadband service requiring a high data rate, a mission critical service requiring high reliability and low latency, and a sensor information collection service requiring accommodation of devices with high density. Specifically, studies have been conducted on a technology in which a communication service is allocated to each of a plurality of virtual networks obtained by logically dividing a communication network, and each communication service transmits and receives data using the allocated virtual network. Note that the virtual networks obtained by logically dividing the communication network are also called slices, and thus may be referred to as slices in the following description.

Also for the PON system, studies have been conducted on a technology of constructing a virtual PON system by securing a necessary communication resource for each service accommodated (see, for example, Japanese Patent No. 6590017).

Japanese Patent No. 6590017 discloses an optical line terminal that determines an optical line termination unit used and a bandwidth to be allocated to the optical line termination unit upon receiving, from the outside, a virtual PON system construction request including information corresponding to a required bandwidth of a virtual PON system and a required bandwidth for each optical network unit belonging to the virtual PON system.

As described above, some OLT in the PON system includes the plurality of optical line termination units. One or more ONUs can be connected to each optical line termination unit. When the PON system including the OLT with such a configuration establishes a plurality of slices and accommodates a plurality of communication services, when a plurality of ONUs is connected to a user terminal to be provided with a certain communication service and is connected to different optical line termination units of the OLT, the slices are established across the plurality of optical line termination units and the plurality of ONUs.

Here, in each slice, the number of the user terminals to be provided with the communication service and a bandwidth required for the user terminal may change with time. When the number of the user terminals or the bandwidth required for the user terminal change, a required bandwidth that is a bandwidth required for the ONU connected to the user terminal also changes, and furthermore, a required bandwidth of the optical line termination unit to which the ONU is connected changes.

When the bandwidth allocated to each slice is shared by the plurality of ONUs, bandwidth allocation in accordance with states of the ONUs is required. Although Japanese Patent No. 6590017 describes that a bandwidth is allocated to each optical line termination unit used when the optical line terminal constructs the virtual PON, no consideration is made about cases when there is a change in the required bandwidth of the ONU connected to the optical line termination unit, which may decrease bandwidth utilization efficiency in the slice set across the plurality of optical line termination units. That is, when the plurality of optical line termination units belongs to one slice, the optical line terminal described in Japanese Patent No. 6590017 fixedly allocates a bandwidth to each optical line termination unit in accordance with the maximum required bandwidth possible for each optical line termination unit in the slice at the time of constructing the slice. As a result, for the plurality of optical line termination units belonging to the same slice, the bandwidth is excessively secured when the maximum bandwidths are not actually required at the same time, which decreases slice accommodation efficiency.

SUMMARY OF THE INVENTION

To solve the above problems and achieve an object, an optical line terminal according to the present disclosure includes: one or more optical line termination units to which an optical network unit of an optical communication system is connected, the one or more optical line termination units acquiring an allocation requested bandwidth from the optical network unit connected; a slice management unit to manage slice configuration information indicating which slice each of the optical network unit connected to the optical line termination unit is included in, and manage a limitation on allocation of bandwidth for the optical network unit as a parameter for allocating bandwidth; and a bandwidth allocation unit to determine, for each of the slice, an allocated bandwidth for each of the optical network unit connected to the optical line termination unit on the basis of the allocation requested bandwidth, the slice configuration information, and the parameter for allocating bandwidth.

DETAILED DESCRIPTION OF THE PREFERRED EMBODIMENTS

Hereinafter, an optical line terminal, an optical communication system, a bandwidth allocation method, a control circuit, and a storage medium according to embodiments of the present disclosure will be described in detail with reference to the drawings.

First Embodiment

Figure 1:
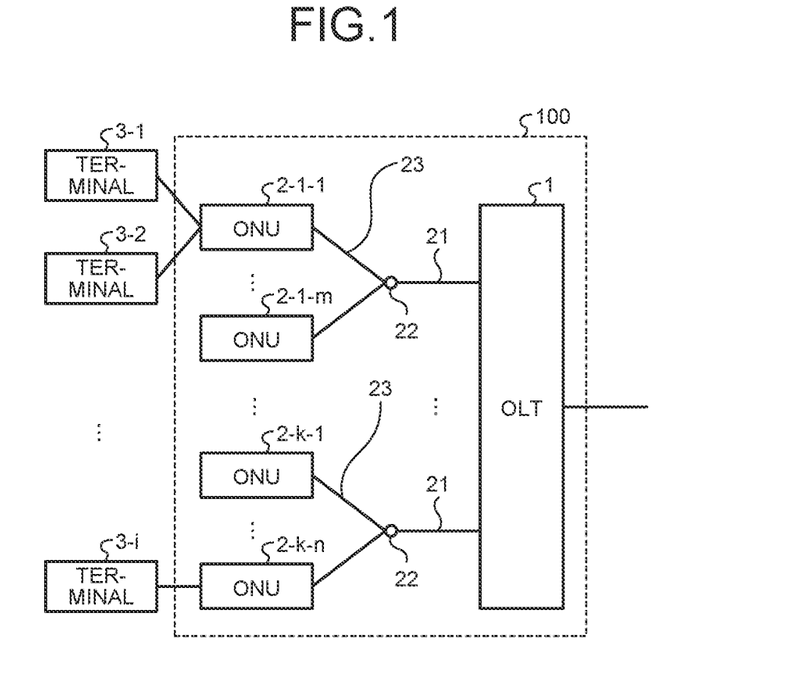
FIG. 1 is a diagram illustrating an example of an optical communication system according to a first embodiment.

FIG. 1 is a diagram illustrating an example of an optical communication system 100 according to a first embodiment. As illustrated in FIG. 1, the optical communication system 100 is a PON system and includes an OLT 1 that is an optical line terminal, and ONUs 2-1-1 to 2-1-$m$, . . . , and 2-$k$-1 to 2-$k$-$n$ that are optical network units. Note that, in the following description, the ONUs 2-1-1 to 2-1-$m$, . . . , and the ONUs 2-$k$-1 to 2-$k$-$n$ may be collectively referred to as ONUs 2 when need not be distinguished from one another.

Trunk optical fibers 21 are connected to the OLT 1 and are branched by passive elements 22 into branch optical fibers 23, to which one or more of the ONUs 2 are connected. The number of the trunk optical fibers 21 connected to the OLT 1 is one or more. When the plurality of the trunk optical fibers 21 is connected to the OLT 1 as in the example illustrated in FIG. 1, the OLT 1 includes the same number of optical line termination units (not illustrated) as the number of the trunk optical fibers 21.

Terminals 3-1 to 3-$i$ are connected to the ONUs 2-1-1 to 2-1-$m$ and 2-$k$-1 to 2-$k$-$n$. The terminal is, for example, a sensor, a base station of a mobile communication system, or the like. FIG. 1 illustrates only the terminals connected to the ONUs 2-1-1 and 2-$k$-$n$ and omits the illustration of terminals connected to the other ONUs. In the optical communication system 100 illustrated in FIG. 1, the terminals 3-1 and 3-2 are connected to the ONU 2-1-1, and the terminal 3-$i$ is connected to the ONU 2-$k$-$n$. Note that, in the following description, the terminals 3-1 to 3-$i$ may be collectively referred to as terminals 3 when need not be distinguished from one another. Although the example illustrated in FIG. 1 has the configuration in which the terminal 3 is directly connected to the ONU 2, as another example, an access point of a wireless local area network (LAN) may be connected to the ONU 2, and the terminal 3 may be connected to the access point. A plurality of or a plurality of types of the terminals 3 may be connected to one ONU 2.

Figure 2:
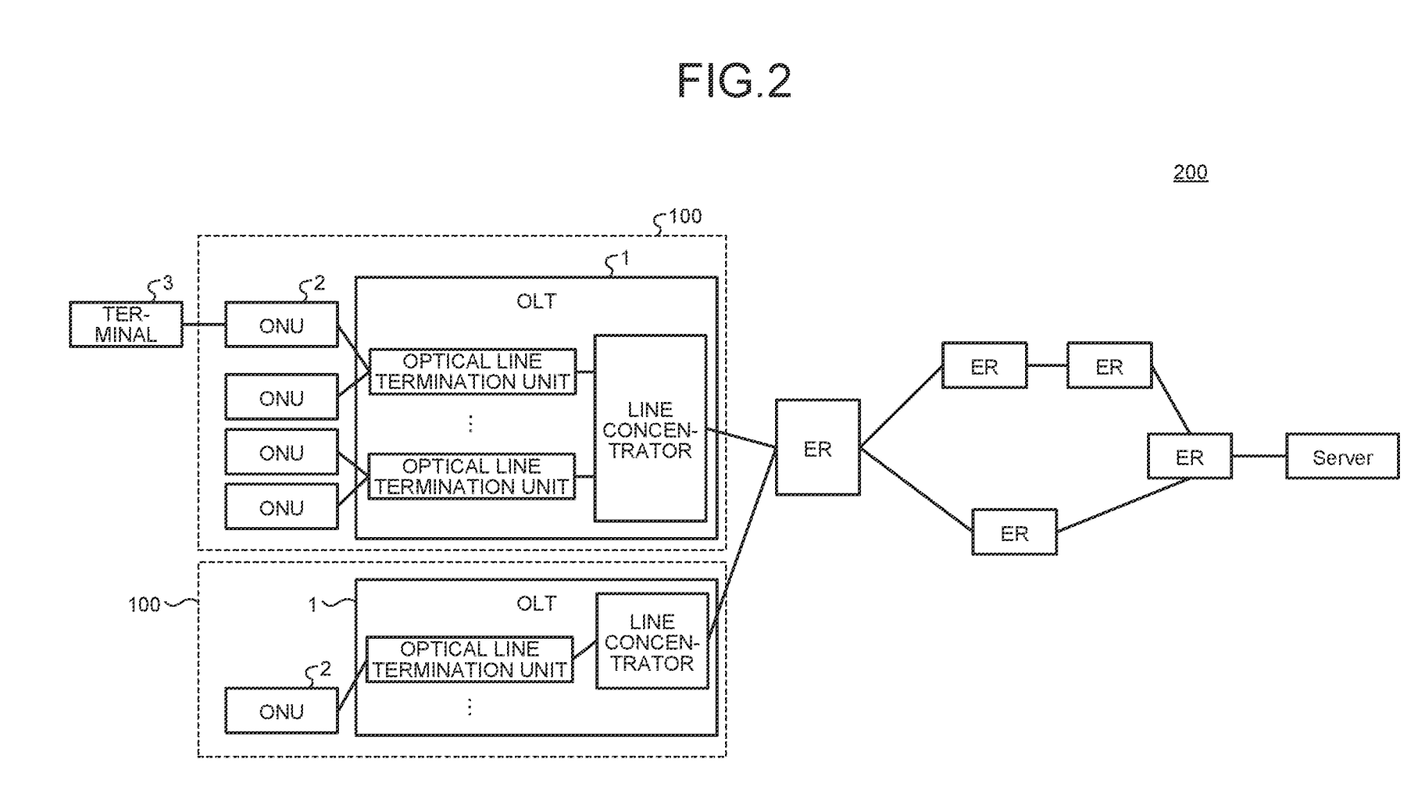
FIG. 2 is a diagram illustrating an example of a configuration of a communication system implemented by applying the optical communication system.
Figure 3:
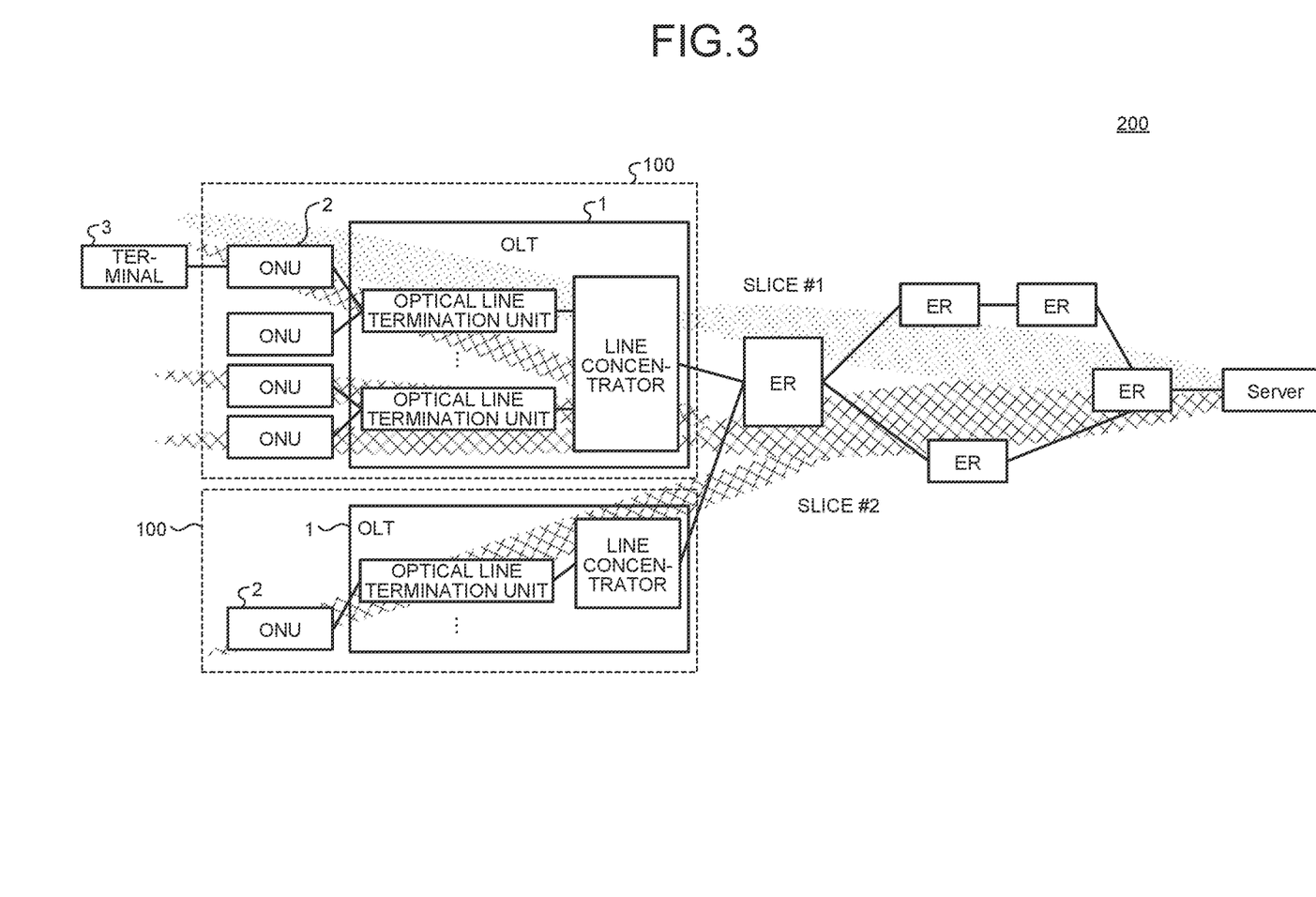
FIG. 3 is a diagram illustrating an example of a method of establishing slices in the communication system.

In addition, the OLT 1 of the optical communication system 100 is connected to a network (not illustrated), and is configured such that one or more slices can be established. For example, as illustrated in FIG. 2, the OLT 1 is connected to an edge router (ER) included in an external network. FIG. 2 is a diagram illustrating an example of a configuration of a communication system 200 implemented by applying the optical communication system 100. As in the example illustrated in FIG. 2, a plurality of the OLTs 1 in a plurality of the optical communication systems 100 may be connected to the edge router included in the network. Also, a server that provides various communication services is connected to the edge router, and, for example, a slice #1 and a slice #2 are established between the server and the ONUs 2 as illustrated in FIG. 3. FIG. 3 is a diagram illustrating an example of a method of establishing slices in the communication system 200. The slice #2 illustrated in FIG. 3 is established across a plurality of the optical line termination units in the OLTs 1 and a plurality of the ONUs 2 in a section in which the optical communication system 100 is applied.

Figure 4:
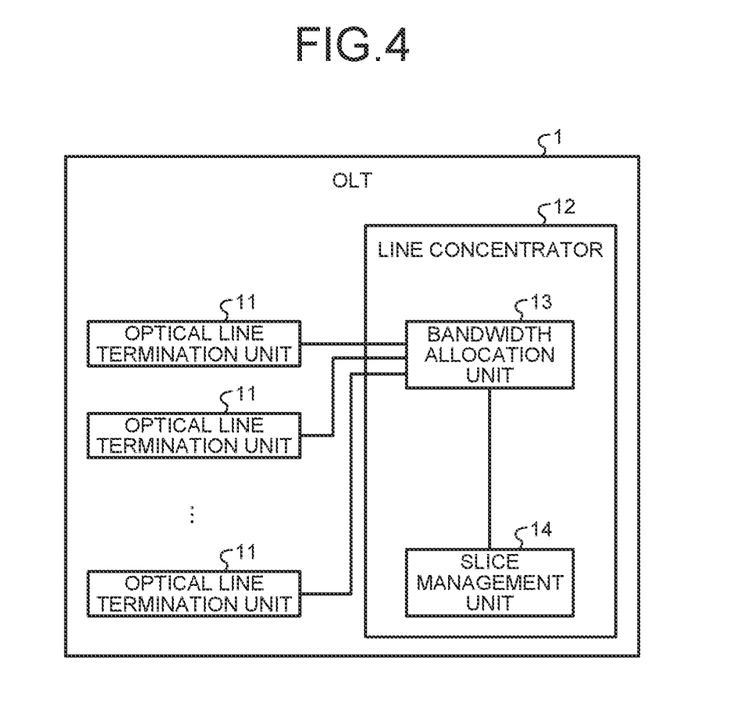
FIG. 4 is a block diagram illustrating an example of a functional configuration of an OLT according to the first embodiment.

FIG. 4 is a block diagram illustrating an example of a functional configuration of the OLT 1 according to the first embodiment. The OLT 1 includes a plurality of optical line termination units 11, and a bandwidth allocation unit 13 and a slice management unit 14 provided in a line concentrator 12. In the example illustrated in FIG. 4, the bandwidth allocation unit 13 and the slice management unit 14 are provided in the line concentrator 12, but one or both of the bandwidth allocation unit 13 and the slice management unit 14 may be provided outside the line concentrator 12.

The optical line termination unit 11 receives a signal including an allocation requested bandwidth from each ONU 2 connected via an optical fiber, extracts the allocation requested bandwidth for each ONU 2, and transmits the extracted allocation requested bandwidth to the bandwidth allocation unit 13. Moreover, the optical line termination unit 11 receives an allocated bandwidth for each ONU 2 from the bandwidth allocation unit 13, and transmits a signal including the allocated bandwidth to each ONU 2. The allocated bandwidth is information indicating a result of bandwidth allocation by the bandwidth allocation unit 13, and specifically, is information indicating a bandwidth allocated by the bandwidth allocation unit 13 to each ONU 2 connected to the optical line termination unit 11.

Note that when the ONU 2 has a plurality of queues for data waiting for transmission, the allocation requested bandwidth that is transmitted by the ONU 2 to the OLT 1 is determined based on the amount of the data waiting for transmission, for each queue. Moreover, when the ONU 2 has a plurality of logical links as logical connections with the OLT 1, the ONU 2 transmits the allocation requested bandwidth, for each logical link.

The slice management unit 14 manages information of a slice established for the OLT 1. Specifically, the slice management unit 14 manages, for each slice, slice configuration information indicating which of the ONUs 2 connected to the OLT 1 is included in the slice, and manages limitations on allocation of bandwidth among the ONUs 2 in the slice as a bandwidth allocation parameter.

Note that the slice configuration information and the parameter for allocating bandwidth managed by the slice management unit 14 are acquired by any method such as setting from a management device or a control device (not illustrated) of a communication network or the optical communication system 100, making an inquiry to these devices, or setting by a device administrator.

The slice management unit 14 determines the optical line termination unit 11 to which each ONU 2 is connected from the information of the ONU 2 included in each slice, and recognizes the optical line termination unit 11 and the ONU 2 included in each slice.

As illustrated in FIG. 3, there may be one or a plurality of the optical line termination units 11 included in each slice. Also, there may be one or a plurality of the ONUs 2 connected to each optical line termination unit 11 in the slice.

A certain one of the ONUs 2 may be included in a plurality of slices. When it is possible that the ONU 2 has a plurality of logical links as the logical connections with the OLT 1, each slice may use a different one of the logical links. When the ONU 2 has a plurality of queues for holding the data waiting for transmission, each slice may use a different one of the queues. The logical links and the queues may be combined. As described above, when the logical links are different, the ONU 2 transmits the allocation requested bandwidth for each logical link. Moreover, the allocation requested bandwidth that is transmitted by the ONU 2 is determined based on the amount of the data waiting for transmission, for each queue.

Figure 5:
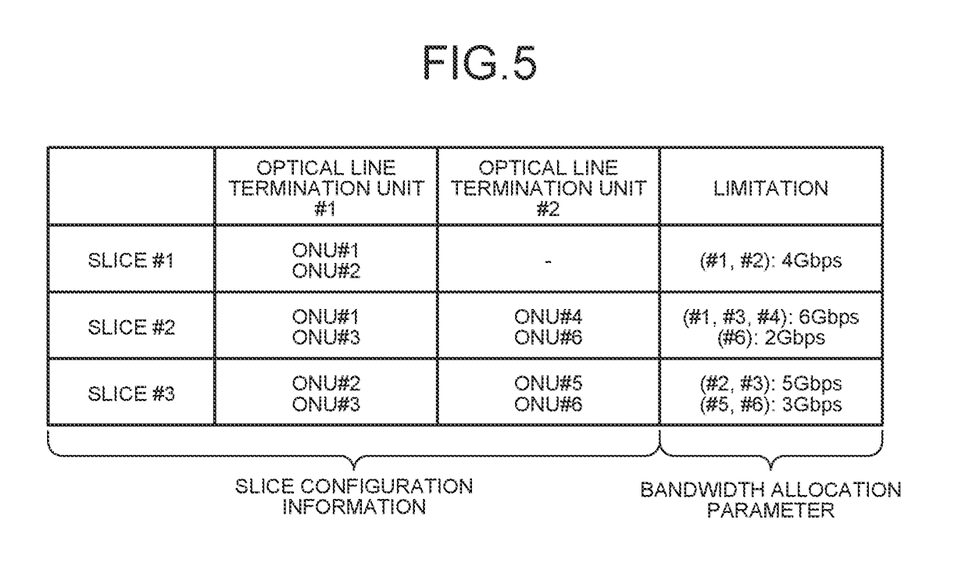
FIG. 5 is a table illustrating an example of information managed by a slice management unit.

FIG. 5 is a table illustrating an example of the information managed by the slice management unit 14. As described above, the information managed by the slice management unit 14 is the slice configuration information and the bandwidth allocation parameter, and the slice management unit 14 manages the slice configuration information and the bandwidth allocation parameter in association with each other. In FIG. 5, ONU #1 to ONU #6 each indicate any of the plurality of ONUs 2 illustrated in FIG. 1, that is, the ONUs 2-1-1 to 2-1-*m*, . . . , and 2-*k*-1 to 2-*k*-*n*. Also, optical line termination units #1 and #2 each indicate any of the plurality of optical line termination units 11 illustrated in FIG. 4. Note that in the description with reference to FIG. 5, the reference numerals of the ONU 2 and the optical line termination unit 11 are omitted for convenience.

The slice configuration information in FIG. 5 indicates that the slice #1 includes the ONU #1 and the ONU #2. As described above, the slice management unit 14 recognizes the ONU for each optical line termination unit, and the slice configuration information indicates that the slice #1 includes the optical line termination unit #1 and the ONUs #1 and #2 among the ONUs connected to the optical line termination unit #1 and does not include the optical line termination unit #2. Moreover, the slice configuration information in FIG. 5 indicates that the slice #2 includes the ONU #1, the ONU #3, the ONU #4, and the ONU #6, and the slice #3 includes the ONU #2, the ONU #3, the ONU #5, and the ONU #6. The bandwidth allocation parameter indicates, for example, that there is a limitation that the bandwidth allocated to each of the ONU #1 and the ONU #2 in the slice #1 adds up to 4 Gbps or less. The limitation on bandwidth allocation may be set across the optical line termination units as with the ONU #1, the ONU #3, and the ONU #4 in the slice #2, or a plurality of limitations may be set in one slice as with the ONUs #2 and #3 and the ONUs #5 and #6 in the slice #3. Moreover, as with the ONU #6 in the slice #2, the limitation on bandwidth allocation may be set for a single ONU. Note that two limitations are set for the slice #2 including a limitation that the bandwidth allocated to each of the ONU #1, the ONU #3, and the ONU #4 adds up to 6 Gbps or less; and a limitation that the bandwidth allocated to the ONU #6 is 2 Gbps or less. Two limitations are set for the slice #3 including a limitation that the bandwidth allocated to each of the ONU #2 and the ONU #3 adds up to 5 Gbps or less; and a limitation that the bandwidth allocated to each of the ONU #5 and the ONU #6 adds up to 3 Gbps or less.

The bandwidth allocation unit 13 determines the allocated bandwidth for each ONU 2 connected to the OLT 1 on the basis of the allocation requested bandwidth that is received from each optical line termination unit 11, and the slice configuration information and the bandwidth allocation parameter managed by the slice management unit 14.

Figure 6:
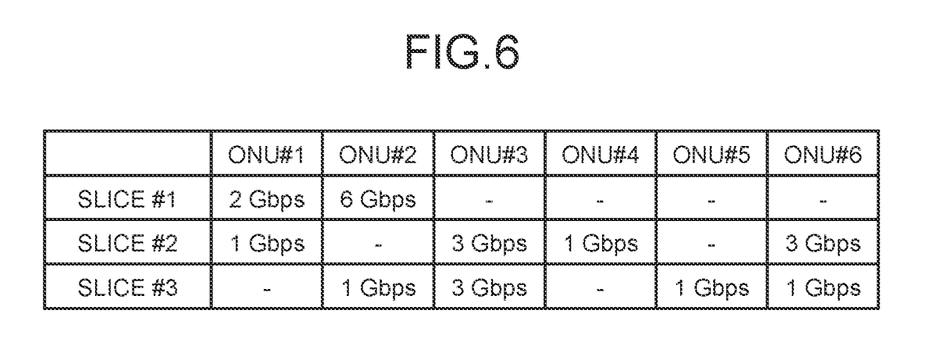
FIG. 6 is a table illustrating an example of allocation requested bandwidth that are received by the OLT from ONUs.

FIG. 6 is a table illustrating an example of the allocation requested bandwidth that are received by the OLT 1 from the ONUs 2. FIG. 6 illustrates the allocation requested bandwidth for each slice received from each of the ONU #1 to ONU #6 illustrated in FIG. 5.

A specific example of the operation of the bandwidth allocation unit 13 will be described with reference to FIGS. 5 and 6. That is, a description will be made of the operation of the bandwidth allocation unit 13 when the allocation requested bandwidth that is received from the ONU #1 to the ONU #6 are as illustrated in FIG. 6 when the slice management unit 14 holds the information illustrated in FIG. 5.

First, the bandwidth allocation unit 13 provisionally determines a bandwidth to be allocated to each ONU in consideration of the limitation on the bandwidth allocation for each ONU in each slice. That is, the bandwidth allocation unit 13 determines, for each slice, a provisional allocated bandwidth for each ONU belonging to the slice, based on the allocation requested bandwidth of the ONU #1 to the ONU #6 in each slice illustrated in FIG. 6 and the limitations on bandwidth allocation for each slice illustrated in FIG. 5.

As illustrated in FIG. 5, the limitation on the bandwidth allocation for the ONU #1 and the ONU #2 in the slice #1 is that the total bandwidth is 4 Gbps or less. On the other hand, as illustrated in FIG. 6, the allocation requested bandwidth for the ONU #1 and the ONU #2 in the slice #1 are 2 Gbps and 6 Gbps, respectively, the total of which exceeds the limitation of 4 Gbps. Therefore, for example, the bandwidth allocation unit 13 uses a ratio between the allocation requested bandwidth of the ONU #1 and the allocation requested bandwidth of the ONU #2 in the slice #1 to determine the provisional allocated bandwidth for each of the ONU #1 and the ONU #2 in the slice #1 as in the following expression (1).

Provisional allocated bandwidth for the ONU #1:

4 Gbps×(2 Gbps/(2 Gbps+6 Gbps))=1 Gbps

Provisional allocated bandwidth for the ONU #2:

4 Gbps×(6 Gbps/(2 Gbps+6 Gbps))=3 Gbps  (1)

Expression (1) illustrates an example of a method for determining the provisional allocated bandwidths, but the determination method is not limited thereto. For example, if priorities, weighting coefficients, or the like are given to the ONUs, the bandwidth allocation unit 13 may determine the provisional allocated bandwidths by a method that does not use the ratio of the allocation requested bandwidth. Examples of the method are allocating a bandwidth to a high-priority ONU and allocating a remaining bandwidth to remaining ONUs, or allocating a bandwidth to each ONU in accordance with a ratio of the weighting coefficients, within a range satisfying the limitations of bandwidth allocation.

The total of each of the allocation requested bandwidth for the ONU #1, the ONU #3, and the ONU #4 in the slice #2 is 1 Gbps, 3 Gbps, and 1 Gbps, respectively, and the sum is 5 Gbps, which satisfies the limitation on bandwidth allocation of 6 Gbps in total. Therefore, the bandwidth allocation unit 13 determines the provisional allocated bandwidths for the ONU #1, the ONU #3, and the ONU #4 in the slice #2 to be values set as the allocation bandwidth requirement. On the other hand, the ONU #6 in the slice #2 has the limitation on bandwidth allocation of 2 Gbps but has the allocation requested bandwidth of 3 Gbps, which does not satisfy the limitation. Therefore, the bandwidth allocation unit 13 determines the provisional allocated bandwidth for the ONU #6 in the slice #2 to be 2 Gbps in accordance with the limitation on bandwidth allocation.

For the slice #3, since the allocation requested bandwidth for each ONU belonging to the slice #3 satisfies the limitation on bandwidth allocation, the bandwidth allocation unit 13 determines the provisional allocated bandwidth for each ONU in the slice #3 to be a value set as the allocation bandwidth requirement.

Figure 7:
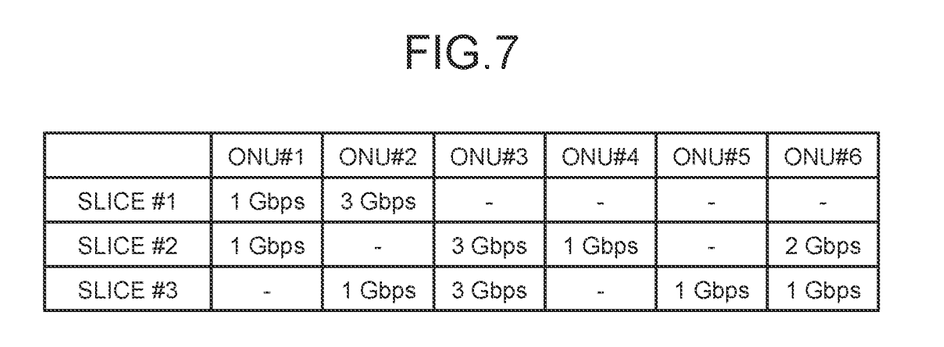
FIG. 7 is a table illustrating an example of provisional allocated bandwidths determined by a bandwidth allocation unit.

FIG. 7 illustrates the provisional allocated bandwidths determined by the bandwidth allocation unit 13 for the ONU #1 to the ONU #6 above. FIG. 7 is a table illustrating an example of the provisional allocated bandwidths determined by the bandwidth allocation unit 13. FIG. 7 illustrates the example of the provisional allocated bandwidths that are determined by the bandwidth allocation unit 13 on the basis of the information illustrated in FIGS. 5 and 6.

Next, the bandwidth allocation unit 13 finalizes the bandwidth to be allocated to each ONU in consideration of an available bandwidth of each optical line termination unit 11. The available bandwidth of the optical line termination unit 11 is a total value of bandwidths that can be allocated to the ONUs 2 connected to the optical line termination unit 11. The bandwidth allocation unit 13 finalizes the bandwidth to be allocated to each ONU in each slice by adjusting the provisional allocated bandwidth for each ONU in each slice determined by the above-described method on the basis of the available bandwidth value of each optical line termination unit 11.

Here, an example of operation of the bandwidth allocation unit 13 will be described assuming that each of the optical line termination units #1 and #2 can allocate a bandwidth of 10 Gbps. Note that, since a transmission signal from the ONU includes an overhead for synchronizing signals in the optical line termination unit 11 of the OLT 1 and redundant data for correcting a transmission error, a bandwidth used for transmitting user data is narrower than a physical bandwidth, which however will be ignored for simplification of the description.

As illustrated in FIG. 7, the provisional allocated bandwidths for the ONU #1 to the ONU #3 belonging to the optical line termination unit #1 are 12 Gbps in total, which exceeds 10 Gbps being the upper limit of the bandwidth that can be allocated by the optical line termination unit #1. Therefore, for example, the bandwidth allocation unit 13 uses a ratio of the provisional allocated bandwidths for the slice #1 to the slice #3 to determine the allocated bandwidth for the slice #1 by the optical line termination unit #1 as in the following expression (2).

Allocated bandwidth for the slice #1 by the optical line termination unit #1:

10 Gbps×(1 Gbps+3 Gbps)/10 Gbps=10/3 Gbps  (2)

The bandwidth allocation unit 13 also determines the allocated bandwidth for the slice #2 and the allocated bandwidth for the slice #3 by a similar method. For the example illustrated in FIG. 7, the allocated bandwidth for each of the slice #2 and the slice #3 by the optical line termination unit #1 is also 10/3 Gbps.

Note that a method of determining the allocated bandwidth for each slice using the ratio of the provisional allocated bandwidths is an example. For example, when priorities, weighting coefficients, or the like are given to the slices, the bandwidth allocation unit 13 may determine the allocated bandwidth for each slice on the basis of the priorities, the weighting coefficients, or the like among the slices within a range in which a total value of the allocated bandwidths for the slices does not exceed the upper limit on the bandwidth that can be allocated by the optical line termination unit #1.

After determining the allocated bandwidth for each slice, the bandwidth allocation unit 13 further determines the allocated bandwidths for the ONU #1 and the ONU #2 belonging to the optical line termination unit #1 in the slice #1 by using a ratio of the provisional allocated bandwidths for the ONUs as in the following expression (3). Allocated bandwidth for the ONU #1 in the slice #1:

10/3 Gbps×(1 Gbps/(1 Gbps+3 Gbps))=5/6 Gbps

Allocated bandwidth for the ONU #2 in the slice #1:

10/3 Gbps×(3 Gbps/(1 Gbps+3 Gbps))=15/6 Gbps  (3)

The bandwidth allocation unit 13 also determines the allocated bandwidths for the ONU #1 to the ONU #3 belonging to the optical line termination unit #1 in the slices #2 and #3 by a similar method. For the example illustrated in FIG. 7, the allocated bandwidth for the ONU #1 in the slice #2 is 5/6 Gbps, the allocated bandwidth for the ONU #3 in the slice #2 is 15/6 Gbps, the allocated bandwidth for the ONU #2 in the slice #3 is 5/6 Gbps, and the allocated bandwidth for the ONU #3 in the slice #3 is 15/6 Gbps.

Lastly, the bandwidth allocation unit 13 finalizes the allocated bandwidth for each of the ONU #1 to the ONU #3 belonging to the optical line termination unit #1 by adding the allocated bandwidths for each ONU in each slice as in the following expression (4). The bandwidth allocation unit 13 transmits the finalized allocated bandwidth for each of the ONU #1 to the ONU #3 to the optical line termination unit #1.

Allocated bandwidth for the ONU #1:

5/6 Gbps+5/6 Gbps=5/3 Gbps

Allocated bandwidth for the ONU #2:

15/6 Gbps+5/6 Gbps=10/3 Gbps

Allocated bandwidth for the ONU #3:

15/6 Gbps+15/6 Gbps=15/3 Gbps　　　　(4)

The operation of determining the allocated bandwidths for the ONU #1 to the ONU #3 belonging to the optical line termination unit #1 has been described, whereas for the ONU #4 to the ONU #6 belonging to the optical line termination unit #2, the provisional allocated bandwidths illustrated in FIG. 7 add up to 5 Gbps, which is less than or equal to 10 Gbps being the upper limit on the bandwidth that can be allocated by the optical line termination unit #2. Therefore, the bandwidth allocation unit 13 determines the provisional allocated bandwidths illustrated in FIG. 7 as finalized allocated bandwidths, and transmits the finalized allocated bandwidth for each of the ONU #4 to the ONU #6 to the optical line termination unit #2.

Figure 8:
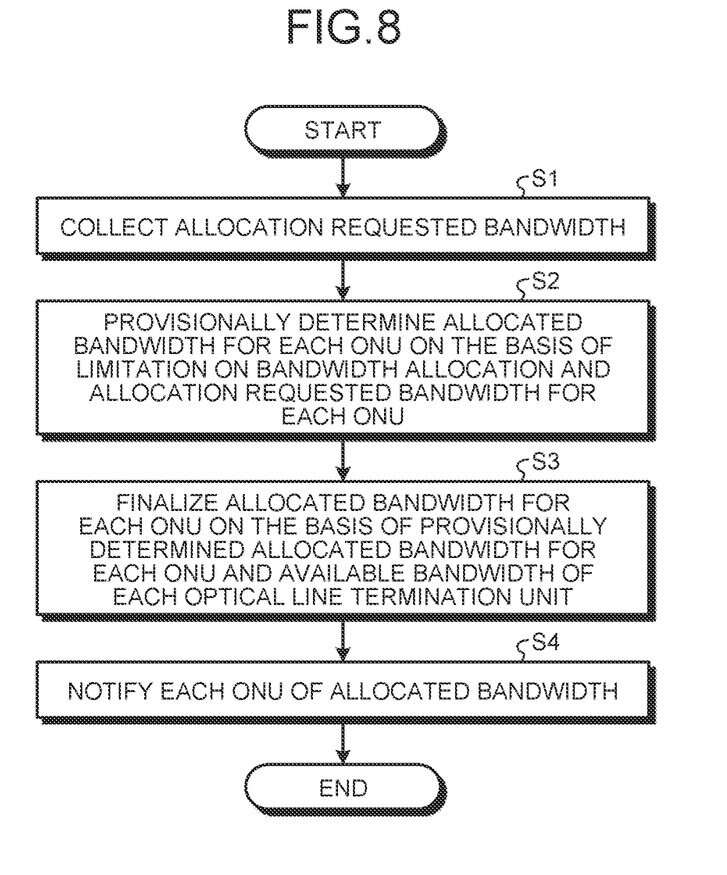
FIG. 8 is a flowchart illustrating an example of an operation of the bandwidth allocation unit in the OLT according to the first embodiment.

The operation of the bandwidth allocation unit 13 described above is illustrated by a flowchart in FIG. 8. FIG. 8 is the flowchart illustrating an example of the operation of the bandwidth allocation unit 13 in the OLT 1 according to the first embodiment.

As illustrated in FIG. 8, the bandwidth allocation unit 13 first collects the allocation requested bandwidth from each ONU 2 connected to the OLT 1 (step S1). In step S1, for example, the bandwidth allocation unit 13 collects the allocation requested bandwidth as illustrated in FIG. 6, that is, the allocation requested bandwidth for each slice from each ONU 2.

Next, the bandwidth allocation unit 13 provisionally determines the allocated bandwidth for each ONU 2 on the basis of the limitation on bandwidth allocation and the allocation requested bandwidth for each ONU 2 (step S2). In step S2, the bandwidth allocation unit 13 determines the provisional allocated bandwidth for each ONU 2 in each slice as illustrated in FIG. 7, for example.

Next, the bandwidth allocation unit 13 finalizes the allocated bandwidth for each ONU 2 on the basis of the provisional allocated bandwidth for each ONU 2 and the available bandwidth of each optical line termination unit 11 (step S3). In step S3, the bandwidth allocation unit 13 finalizes the allocated bandwidth for each ONU 2 by adjusting the provisional allocated bandwidth for each ONU 2 on the basis of the available bandwidth of each optical line termination unit 11 as described above.

Next, the bandwidth allocation unit 13 notifies each ONU 2 of the finalized allocated bandwidth (step S4).

As described above, in accordance with the requirement of the slice, the OLT 1 according to the present embodiment provisionally determines the allocated bandwidth for each ONU 2 belonging to each slice in consideration of the limitations on bandwidth allocation among the ONUs 2 included in the slice and, when the slice is established across a plurality of the optical line termination units 11, the OLT 1 adjusts the provisionally determined allocated bandwidth in consideration of the available bandwidth value of each optical line termination unit 11, thereby finalizing the allocated bandwidth. This as a result can improve the bandwidth utilization efficiency in the PON system in which the slice is established.

Second Embodiment

Figure 9:
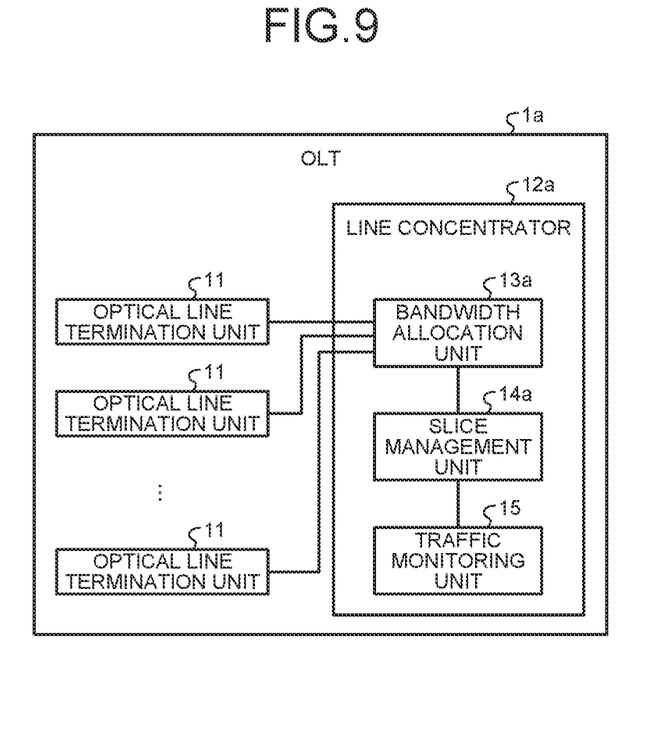
FIG. 9 is a block diagram illustrating an example of a functional configuration of an OLT according to a second embodiment.

FIG. 9 is a block diagram illustrating an example of a functional configuration of an OLT 1a according to a second embodiment. Note that a configuration of an optical communication system to which the OLT 1a is applied is similar to that of the optical communication system 100 to which the OLT 1 according to the first embodiment is applied. In the present embodiment, parts that are different from those of the first embodiment will be described, and parts that are common to those of the first embodiment will not be described.

The OLT 1a is obtained by replacing the line concentrator 12 in the OLT 1 according to the first embodiment with a line concentrator 12a. The line concentrator 12a includes a bandwidth allocation unit 13a that determines an allocated bandwidth for each ONU 2 connected to the optical line termination unit 11, a slice management unit 14a that manages information of a slice established to the OLT 1a, and a traffic monitoring unit 15 that monitors a communication traffic volume of each ONU 2 connected to the OLT 1a.

The bandwidth allocation unit 13a determines the allocated bandwidth for each ONU 2 in each slice on the basis of an allocation requested bandwidth sent from each ONU 2 and information managed by the slice management unit 14a.

The slice management unit 14a manages the slice configuration information and the bandwidth allocation parameter described above as with the slice management unit 14 according to the first embodiment, and further manages information calculated on the basis of a traffic monitoring result by the traffic monitoring unit 15. A method of calculating the information managed by the slice management unit 14a together with the slice configuration information and the bandwidth allocation parameter will be described later.

The traffic monitoring unit 15 monitors upstream communication traffic for each slice and for each ONU 2 at a predetermined cycle, calculates a communication bandwidth that is a value of a bandwidth predicted to be demanded in the future on the basis of the monitoring result, and transmits the communication bandwidth to the slice management unit 14a. For example, the traffic monitoring unit 15 calculates a rate of change over time of the upstream communication traffic for each slice and for each ONU, calculates the communication bandwidth for each slice and for each ONU 2 on the basis of the calculated rate of change over time and a bandwidth actually used, and transmits the communication bandwidth to the slice management unit 14a. For example, in a bandwidth allocation cycle that is a cycle in which the bandwidth allocation unit 13a determines the allocated bandwidth and allocates the bandwidth to each ONU 2, the traffic monitoring unit 15 observes a bandwidth actually used for transmission to the OLT 1a by each ONU 2 in each slice, and multiplies the observed bandwidth by the rate of change over time to obtain the communication bandwidth.

The rate of change over time of the communication traffic may be acquired by any method such as performing setting from a management device or a control device (not illustrated) of a communication network or the optical communication system 100, making an inquiry to these devices, or performing setting by a device administrator. When the rate of change over time of the communication traffic only for each slice can be acquired instead of the rate of change over time of the communication traffic for each slice and for each ONU, a single rate of change over time is used in the slice regardless of the ONU 2. Alternatively, the rate of change over time of the communication traffic may be estimated from the monitoring result by the traffic monitoring unit 15.

The slice management unit 14a adds a margin to the communication bandwidth for each slice and for each ONU 2 received from the traffic monitoring unit 15, and calculates an estimated communication bandwidth upper limit. The margin added to the communication bandwidth may be determined to be, for example, 5% of the communication bandwidth, 10% of the communication bandwidth, or the like on the basis of the monitoring result by the traffic monitoring unit 15 (that is, the communication bandwidth for each slice and for each ONU 2). Note that the estimated communication bandwidth upper limit may be calculated by the traffic monitoring unit 15.

The bandwidth allocation unit 13a determines the allocated bandwidth for each ONU 2 in each slice by a procedure similar to that of the bandwidth allocation unit 13 in the OLT 1 according to the first embodiment. However, the bandwidth allocation parameter used in determining the allocated bandwidth is different.

Specifically, the bandwidth allocation unit 13a checks whether or not the communication bandwidths calculated by the traffic monitoring unit 15 and managed by the slice management unit 14a each satisfy a predetermined condition, and if any of the communication bandwidths satisfies the condition, the bandwidth allocation unit 13a determines the allocated bandwidth by using the communication bandwidth satisfying the condition instead of the bandwidth allocation parameter managed by the slice management unit 14a, that is, the limitation on bandwidth allocation. More specifically, for the ONU 2 whose limitation on bandwidth allocation is the limitation for a single ONU 2 in each slice, the bandwidth allocation unit 13a uses a lower one of the estimated communication bandwidth upper limit and the limitation on bandwidth allocation for the ONU 2 as the bandwidth allocation parameter for the ONU 2 in each slice. That is, when a condition that the estimated communication bandwidth upper limit of the ONU 2 is lower than the limitation on bandwidth allocation for a single ONU 2 is satisfied, the bandwidth allocation unit 13a determines the allocated bandwidth by using the estimated communication bandwidth upper limit. Moreover, in some cases, the limitation on bandwidth allocation is the limitation for a plurality of the ONUs 2 (hereinafter referred to as a group of the ONUs 2) in each slice. In such cases, regarding the group of the ONUs 2, the bandwidth allocation unit 13a uses, as the bandwidth allocation parameter, a lower one of: a total value of the estimated communication bandwidth upper limits for the ONUs 2 in the group of the ONUs 2, and the limitation on bandwidth allocation for the group of the ONUs 2 in each slice. That is, when a condition that the total value of the estimated communication bandwidth upper limits for the group of the ONUs 2 is lower than the limitation on bandwidth allocation for the group of the ONUs 2 is satisfied, the bandwidth allocation unit 13a determines the allocated bandwidth by using the total value of the estimated communication bandwidth upper limits for the group of the ONUs 2.

As described above, the limitation on bandwidth allocation is set to the slice as the upper limit. Then, when actual usage of the communication bandwidth is predicted to be lower than the limitation, the bandwidth allocation unit 13a in the OLT 1a according to the second embodiment sets the bandwidth allocation parameter to a smaller value, and calculates the allocated bandwidth on the basis of the bandwidth allocation parameter obtained after the change of the setting. Therefore, the bandwidth allocation according to the actual bandwidth usage can be implemented, and the bandwidth utilization efficiency in the PON system in which the slice is set can be further improved as compared with the first embodiment.

Note that the monitoring of the communication traffic volume by the traffic monitoring unit 15 may be assumed to use the allocation requested bandwidth that is acquired by the optical line termination unit 11, and may be included in the function of the optical line termination unit 11. That is, the above processing may be performed by regarding the rate of change over time of the allocation requested bandwidth as the rate of change over time of the communication traffic, and regarding the allocation requested bandwidth as the bandwidth actually used.

Figure 10:
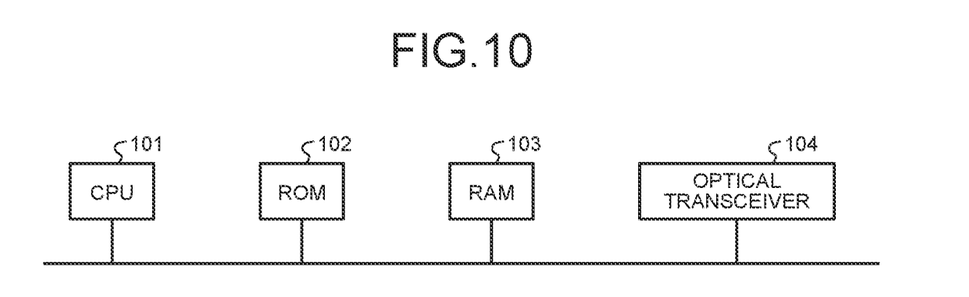
FIG. 10 is a diagram illustrating an example of a configuration of hardware for implementing the OLT according to the second embodiment.

Here, a hardware configuration of the OLT 1a according to the second embodiment will be described with reference to FIG. 10. FIG. 10 is a diagram illustrating an example of a configuration of hardware for implementing the OLT 1a according to the second embodiment.

The OLT 1a is implemented by, for example, a central processing unit (CPU) 101, a read only memory (ROM) 102, a random access memory (RAM) 103, and an optical transceiver 104 illustrated in FIG. 10. The CPU 101, the ROM 102, the RAM 103, and the optical transceiver 104 are each connected by a bus. The optical transceiver 104 is connected to the ONU 2 (not illustrated) via an optical fiber, and transmits and receives an optical signal. The components of the OLT 1a are implemented by software, firmware, or a combination of software and firmware. The software and firmware are described as programs and stored in the ROM 102. The CPU 101 implements the functions of the units in the OLT 1a by reading and executing the programs stored in the ROM 102.

Alternatively, some or all of the functions of the units in the OLT 1a can be implemented by dedicated hardware. The dedicated hardware corresponds to, for example, a single circuit, a complex circuit, a programmed processor, a parallel-programmed processor, an application specific integrated circuit (ASIC), a field programmable gate array (FPGA), or a combination thereof. The functions of the units in the OLT 1a may be implemented individually by individual dedicated hardware, or may be implemented collectively by dedicated hardware.

Although the hardware configuration of the OLT 1a according to the second embodiment has been described, a hardware configuration of the OLT 1 according to the first embodiment is similar.

The optical line terminal according to the present disclosure has an effect of improving the bandwidth utilization efficiency in the optical communication system in which the slice is constructed.

The configurations illustrated in the above embodiments merely illustrate an example so that another known technique can be combined, the embodiments can be combined together, or the configurations can be partially omitted and/or modified without departing from the scope of the present disclosure.

What is claimed is:
1. An optical line terminal comprising:
one or more optical line termination circuits to each of which one or more optical network units of an optical communication system is connected, the one or more optical line termination circuits acquiring an allocation requested bandwidth from the one or more optical network units connected;
a slice management circuit to manage slice configuration information indicating which slice each of the optical network units connected to the optical line termination circuit is included in, and manage a limitation on allocation of bandwidth for the one or more optical network units as a parameter for allocating bandwidth; and a bandwidth allocation circuit to determine, for each of the slice, an allocated bandwidth for each of the optical network units connected to the optical line termination circuit on the basis of the allocation requested bandwidth, the slice configuration information, and the parameter for allocating bandwidth.

2. The optical line terminal according to claim 1, wherein the bandwidth allocation circuit determines, on the basis of the allocation requested bandwidth, the slice configuration information, and the parameter for allocating bandwidth, a provisional allocated bandwidth for each of the optical network units connected to the optical line termination circuit for each of the slice established in the optical line terminal, and determines a finalized allocated bandwidth by adjusting each of the provisional allocated bandwidth determined on the basis of an available bandwidth value of each of the one or more of the optical line termination circuits.

3. The optical line terminal according to claim 1, comprising a traffic monitoring circuit to calculate, for each of the slice, an estimated communication bandwidth upper limit that is an upper limit of a bandwidth used for upstream transmission by each of the optical network units, on the basis of upstream communication traffic of each of the optical network units, wherein when the estimated communication bandwidth upper limit satisfies a predetermined condition, the bandwidth allocation circuit determines the allocated bandwidth by using the estimated communication bandwidth upper limit that satisfies the condition instead of the parameter for allocating bandwidth.

4. The optical line terminal according to claim 3, wherein the parameter for allocating bandwidth includes the limitation on allocation of bandwidth for one of the optical network units and a limitation on a total value of allocation of bandwidths for a group of a plurality of the optical network units, and the bandwidth allocation circuit compares the limitation on allocation of bandwidth for the one of the optical network units with the estimated communication bandwidth upper limit of the one optical network unit, and determines the allocated bandwidth by using the estimated communication bandwidth upper limit of the one optical network unit when the estimated communication bandwidth upper limit of the one optical network unit is lower, and compares the limitation on the total value of allocation of bandwidths for the group with a total value of the estimated communication bandwidth upper limits of the optical network units in the group, and determines the allocated bandwidth by using the total value of the estimated communication bandwidth upper limits when the total value of the estimated communication bandwidth upper limits is lower.

5. The optical line terminal according to claim 3, wherein the traffic monitoring circuit externally acquires a rate of change over time of the communication traffic, calculates a communication bandwidth that is a predicted value of a bandwidth demanded in the future in each of the slice by the optical network unit on the basis of the rate of change over time acquired, adds a predetermined margin to the communication bandwidth calculated, and obtains the estimated communication bandwidth upper limit.

6. The optical line terminal according to claim 3, wherein the traffic monitoring circuit monitors the communication traffic using the allocation requested bandwidth that is acquired by the optical line termination circuit.

7. An optical communication system comprising:
the optical line terminal according to claim 1; and
one or more optical network units is connected to each of the one or more optical line termination circuits in the optical line terminal.

8. A bandwidth allocation method in which an optical line terminal of an optical communication system determines an allocated bandwidth indicating a bandwidth allocated to one or more optical network units each of which is connected to an optical line termination circuit, the bandwidth allocation method comprising:

acquiring an allocation requested bandwidth from each of the one or more optical network units connected to the optical line termination circuit; and determining, for each slice, an allocated bandwidth for each of the one or more optical network units connected to the optical line termination circuit on the basis of the allocation requested bandwidth acquired, slice configuration information indicating which of the slice each of the optical network units is included in, and a parameter for allocating bandwidth indicating a limitation on allocation of bandwidth for the one or more optical network units.

9. A control circuit for controlling an optical line terminal in an optical communication system, the control circuit causing the optical line terminal to execute:

acquiring an allocation requested bandwidth from one or more optical network units each of which is connected to an optical line termination circuit in the optical line terminal; and determining, for each slice, an allocated bandwidth for each of the one or more optical network units connected to the optical line termination circuit on the basis of the allocation requested bandwidth acquired, slice configuration information indicating which of the slice each of the optical network units is included in, and a parameter for allocating bandwidth indicating a limitation on allocation of bandwidth for the one or more optical network units.

10. A non-transitory storage medium storing a program for controlling an optical line terminal in an optical communication system, wherein the program causes the optical line terminal to execute:
acquiring an allocation requested bandwidth from one or more optical network units each of which is connected to an optical line termination circuit in the optical line terminal; and determining, for each slice, an allocated bandwidth for each of the one or more optical network units connected to the optical line termination circuit on the basis of the allocation requested bandwidth acquired, slice configuration information indicating in which of the slice each of the optical network units is included, and a parameter for allocating bandwidth indicating a limitation on allocation of bandwidth for the one or more optical network units.

* * * * *